United States Patent [19]

Sakashita et al.

[11] Patent Number: 4,526,920
[45] Date of Patent: Jul. 2, 1985

[54] CURABLE COATING COMPOSITION CONTAINING ACRYLOYL OR METHACRYLOYL CYANURATE OR ISOCYANURATE COMPOUND, CURED COMPOSITION THEREFROM, AND PROCESS FOR PRODUCING ARTICLES BY USING THE CURABLE COMPOSITION

[75] Inventors: Takeshi Sakashita, Iwakuni; Hajime Inagaki, Ohtake; Akira Todo, Iwakuni; Takayuki Nakano, Ohtake, all of Japan

[73] Assignee: Mitsui Petrochemical Industries, Ltd., Tokyo, Japan

[21] Appl. No.: 519,238

[22] Filed: Aug. 2, 1983

[30] Foreign Application Priority Data

Aug. 5, 1982 [JP] Japan ................ 57-135716

[51] Int. Cl.$^3$ .................................... C08F 226/06
[52] U.S. Cl. .................. 524/850; 204/159.23; 524/548; 526/261
[58] Field of Search ............... 526/261; 524/548, 850

[56] References Cited

U.S. PATENT DOCUMENTS 2,934,525 8/1960 Fekete .................. 526/261
4,348,456 9/1982 Imanaka et al. .......... 526/261
4,420,597 12/1983 Gruber ................. 526/261

*Primary Examiner*—Harry Wong, Jr.
*Attorney, Agent, or Firm*—Sherman & Shalloway

[57] ABSTRACT

In a curable coating composition comprising an acryloyl or methacryloyl cyanurate or isocyanurate compound, an acrylic or methacrylic ester compound and a polymerization initiator capable of curing said components; the improvement wherein said composition is composed of
(A) 100 parts by weight of an acryloyl- or methacryloyl-oxyalkyl cyanurate or isocyanurate compound of the following formula (I) or (I)′

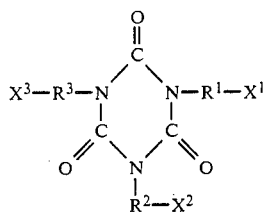

(I)

or

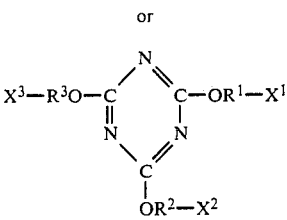

(I)′ wherein $X^1$, $X^2$, $X^3$, $R^1$, $R^2$ and $R^3$ are defined in claim 1

(B) more than 0 to 1,000 parts by weight of a component selected from the group consisting of ($b_1$) a polyacrylate or polymethacrylate with a number average molecular weight of about 240 to about 3,000 of an oxy- or polyoxy-alkanepolyol containing 1 or more ether linkages and 3 or more hydroxyl groups per molecule, and ($b_2$) a poly(meth)acrylate of an alkanepolyol having 4 or more hydroxyl groups per molecule.

(C) 0.01 to 20 parts by weight, per 100 parts by weight of the components (A) and (B) combined, of a polymerization initiator capable of curing said components, and (D) 0 to 200 parts by weight per 100 parts by weight of the components (A) and (B), of an inorganic solid filler.

15 Claims, No Drawings

CURABLE COATING COMPOSITION CONTAINING ACRYLOYL OR METHACRYLOYL CYANURATE OR ISOCYANURATE COMPOUND, CURED COMPOSITION THEREFROM, AND PROCESS FOR PRODUCING ARTICLES BY USING THE CURABLE COMPOSITION

This invention relates to a curable coating composition composed of an acryloyl or methacryloyl cyanurate or isocyanurate compound, an acrylic or methacrylic ester compound and a polymerization initiator capable of curing the above components. This invention also relates to a cured coating composition therefrom and a process for producing articles by using the curable composition.

Specifically, this invention relates to a curable coating composition having excellent curing characteristics in air and capable of forming on the surface of a substrate a cured coating layer having improved properties such as excellent hardness, scratch resistance, abrasion resistance, flexibility, surface gloss, thermal durability, water resistance, chemical (or solvent) resistance, weatherability and adhesion. This invention also relates to a cured composition derived from this curable coating composition, and a process for producing articles having a cured coating layer derived from the curable composition.

More specifically, this invention relates, in a curable coating composition comprising an acryloyl or methacryloyl cyanurate or isocyanurate compound, an acrylic or methacrylic ester compound and a polymerization initiator capable of curing said components, to the improvement wherein said composition is composed of (A) 100 parts by weight of an acryloyl- or methacryloyl-oxyalkyl cyanurate or isocyanurate compound of the following formula (I) or (I)'

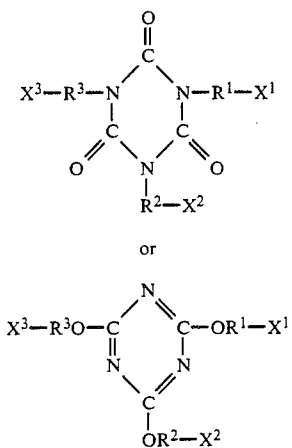

wherein each of $X^1$, $X^2$ and $X^3$ represents a member selected from the class consisting of a hydrogen atom, alkyl groups having 1 to 4 carbon atoms, an acryloyl group [$H_2C=CHCO-$] and a methacryloyl group [$H_2C=(CH_3)CO-$], provided that at least two of $X^1$, $X^2$ and $X^3$ are selected from the class consisting of an acryloyl group and a methacryloyl group, and each of $R^1$, $R^2$ and $R^3$ represents an oxyalkylene or poly(oxyalkylene) group, (B) more than 0 to 1000 parts by weight of (b₁) a polyacrylate or polymethacrylate with a number average molecular weight of about 240 to about 3,000 of an oxy- or polyoxy-alkanepolyol containing one or more ether linkage and three or more hydroxyl groups per molecule, and/or (b₂) a poly(meth)acrylate of an alkanepolyol containing 4 or more hydroxyl groups per molecule, (C) 0.01 to 20 parts by weight, per 100 parts by weight of the components (A) and (B) combined, of a polymerization initiator capable of curing said components, and (D) 0 to 200 parts by weight, per 100 parts by weight of the components (A) and (B) combined, of an inorganic solid filler.

Generally, molded articles of thermoplastic resins and thermosetting resins have lighter weight and higher impact strength and are easier to fabricate than metallic articles and glass articles. Because of these advantages, the former have widely superseded the latter in the fields of automobiles, autocycles, household electrical appliances, sundries, and many other articles. These plastic articles, however, have the defect that they are susceptible to surface mar because they have lower surface hardness than metals or glass and lower resistance to scratching or rubbing. For example, these plastic articles are susceptible to surface mar upon contact, collision, scratching, etc. during transportation, use, setting, etc. Because of such surface defects, the utilization of the plastic articles is very much restricted.

Many proposals have been made heretofore about methods of remedying the aforesaid defects of the surfaces of such resin articles. Most of these proposals are based on a method of coating the surfaces of these articles with an outer coating of a cross-linked cured resin. As a resin or resin-forming component among these film-forming elements, there have been proposed, for example, a silicone-type monomer with or without various polymers, a resin composition composed of methylolmelamine and another curing component, and a composition of a polyfunctional acrylic carboxylic acid ester derivative and another polymer component.

However, since the adhesion of a resin article as a substrate such as a polyolefin to a coated layer composed of such film-forming elements is generally not good, the coating is liable to separate from such a laminated molded article. It is also known to subject the surface of a resin substrate to various treatments in order to remedy these defects. For example, surface-treatment with corona discharge and surface-treatment with a primer have been proposed. Even when such a surface treatment is effected, it is in many cases difficult to increase the adhesion of the coated layer of a cross-linked cured resin to the treated surface of a resin article such as a polyolefin article to a level sufficient to endure practical use. Silicone-type film-forming elements have the defect of being expensive and economically disadvantageous.

It is known to use acryloyl or methacryloyl cyanurate or isocyanurate compounds which overlap those of formula (I) or (I)' in the present invention.

For example, Japanese Patent Publication No. 16091/1971 (published on May 1, 1971) discloses a process for producing a resinous substance useful as a resin vehicle of paints. The Japanese patent document describes a process for producing a resinous substance, which comprises performing an ester linkage-forming reaction between a part or the whole of the hydroxyl groups of a tris-hydroxyalkylisocyanurate represented by the following formula

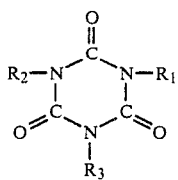

wherein $R_1$, $R_2$ and $R_3$ each represent a linear alkyl group having 2 to 4 carbon atoms and containing a hydroxyl group, and an unsaturated basic acid having at least one unsaturated linkage between carbons thereby to form a tris-hydroxyalkyl isocyanurate derivative having an unsaturated linkage at the side chain, and reacting the derivative either singly or together with another compound having an unsaturated linkage between carbons. This patent document discloses that a hard resinous product is obtained by dissolving an unsaturated basic acid ester of the tris-hydroxyalkyl isocyanurate in a compound having an unsaturated linkage between carbons, and three-dimensionally crosslinking the aforesaid compound by irradiation of ultraviolet light or ionizing radiations, heating it, or polymerizing it in the presence of a polymerization initiator at a temperature of $-10°$ to $300°$ C. The patent publication exemplifies styrene, divinylbenzene, vinyl acetate, methyl methacrylate, diallyl phthalate and triallyl cyanurate as a compound having an unsaturated linkage between carbons. It, however, fails completely to disclose the component ($b_1$) or ($b_2$) used in the composition of the present invention. As shown in Comparative Example 1 in Table 1 of this application, a cured coating layer having the above improved properties in a well balanced state cannot be formed by the process of this patent publication.

As another proposal, Japanese Laid-Open Patent Publication No. 62269/1979 laid open on May 19, 1979) describe a polyester shaped article coated with a vinyl polymer composed mainly of an acrylic or methacrylic ester represented by the following formula

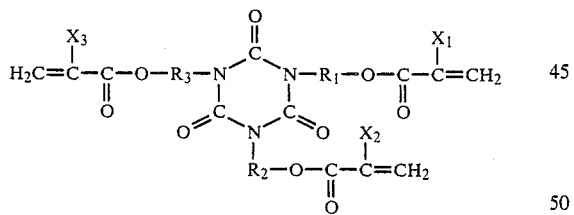

wherein $X_1$, $X_2$ and $X_3$ are identical or different and each represents a hydrogen atom or a methyl group, and $R_1$, $R_2$ and $R_3$ are identical or different and each represents an alkylene group having 1 to 20 carbon atoms or an oxydialkylene group.

The patent document cites styrene, methyl methacrylate, acrylonitrile, acrylic acid, vinyl acetate, methacrylamide, 2-hydroxyethyl acrylate, tetrahydrofurfuryl methacrylate, 2-ethylhexyl methacrylate, tetramethylene glycol diacrylate, diethylene glycol dimethacrylate, polyethylene glycol dimethacrylate, trimethylolpropane triacrylate, bisallyl carbonate, diallyl phthalate and n-butyl allyl ether as examples of the other vinyl monomer which may be further incorporated in a coating liquid composition forming the aforesaid coating. This patent document neither discloses the component ($b_1$) or ($b_2$) in the composition of this invention. As shown by Comparative Examples 2 and 10 in Tables 1 and 3, a cured coating layer having the aforesaid improved properties in a well balanced state cannot be formed by the technique of this patent document.

Japanese Laid-Open Patent Publication No. 30466/1974 (laid open on Mar. 18, 1974) discloses a resin composition easily curable by ultraviolet light by addition of a photosensitizer, comprising an acryloyl or methacryloyl compound of isocyanuric acid obtained by reacting an isocyanuric acid derivative with acrylic or methacrylic acid. It gives di- or higher acrylic or methacrylic esters of epoxy compounds, unsaturated polyesters, and compounds obtained by subjecting hexamethoxymethylmelamine to ether exchange reaction with a $\beta$-hydroxyalkylmethacrylate as examples of other components which may further be incorporated in the resin composition. It also describes that the acrylic or methacrylic esters of the epoxy compounds may be of the bisphenol, polyphenol, polyhydric alcohol, polybasic acid, $\beta$-methylglycidyl, alicyclic epoxy, and epoxidized olefin types. The patent does not at all disclose the conjoint use of the component ($b_1$) or ($b_2$) in the composition of this invention. As shown in Comparative Example 3 in Table 1, a cured coating layer having the aforesaid improved properties in a well balanced state cannot be formed by the technique of this patent document.

The present inventors noted that a cured coated layer having the above-mentioned properties in a well balanced state is difficult to prepare from the aforesaid conventional curable coating compositions comprising an acryloyl or methacryloyl cyanurate or isocyanurate compound, an acrylic or methacrylic ester compound a polymerization initiator capable of curing the above components, and have made investigations in order to develop an improved composition free from the defect of the prior proposals.

These investigations have led to the discovery that a curable coating composition comprising (A) 100 parts by weight of an acryloyl- or methacryloyl-oxyalkyl cyanurate or isocyanurate compound of the following formula (I) or (I)'

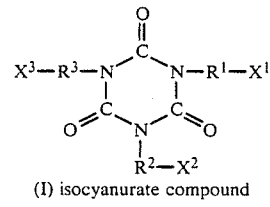

(I) isocyanurate compound or

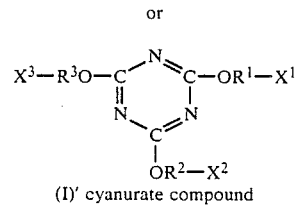

(I)' cyanurate compound wherein each of $X^1$, $X^2$ and $X^3$ represents a member selected from the class consisting of a hydrogen atom, alkyl groups having 1 to 4 carbon atoms, an acryloyl group ($H_2C=CHCO-$) and a methacryloyl group [$H_2C=C(CH_3)CO-$], provided that at least two of $X^1$, $X^2$ and $X^3$ are groups selected from the class consisting of acryloyl and methacryloyl groups, and each of $R^1$, $R^2$ and $R^3$ represents an oxyalkylene or poly(oxyalkylene) group, (B) more than 0 to 1000 parts by weight of ($b_1$) a polyacrylate or polymethacrylate with a number average molecular weight of about 240 to about 3,000 of an oxy- or polyoxy-alkanepolyol containing one or more ether linkages and three or more hydroxyl groups per molecule and/or ($b_2$) a poly(meth)acrylate of an alkanepolyol containing 4 or more hydroxyl groups per molecule, (C) 0.01 to 20 parts by weight, per 100 parts by weight of the components (A) and (B) combined, of a polymerization initiator capable of curing said components, and (D) 0 to 200 parts by weight, per 100 parts by weight of the components (A) and (B) combined, of an inorganic solid filler, has excellent curing characteristics in air, for example a high curing speed, and can form a cured coating layer having improved properties such as hardness, scratch resistance, abrasion resistance, flexibility, surface gloss, thermal durability, water resistance, chemical (or solvent) resistance, weatherability and adhesion in a well balanced state.

It is an object of this invention therefore to provide an improved curable coating composition.

The above and other objects and advantages of this invention will become more apparent from the following description.

In the cyanurate or isocyanurate compound (A) of formula (I) or (I)', each of $R^1$, $R^2$ and $R^3$ represents an oxyalkylene $[-CH_2)_mO]$ or polyoxyalkylene $[\{(CH_2)_{\overline{m}}O\}_n]$ group. Preferred oxyalkylene groups have 1 to 12 carbon atoms, i.e. m=1 to 12, more preferably 2 to 4 carbon atoms, and examples of preferred poly(oxyalkylene)s are 2 to 12-mers, i.e. dimers to dodecamers (n=2 to 12) more preferably 2 to 4-mers, of the above oxyalkylenes.

Specific examples of the component (A) are isocyanurate compounds of formula (I) such as tris(acryloyloxyethyl)isocyanurate, tris(methacryloyloxyethyl)isocyanurate, tris(2-acryloyloxypropyl)isocyanurate, tris(2-methacryloyloxypropyl)isocyanurate, bis(acryloyloxyethyl)hydroxyethyl isocyanurate, bis(methacryloyloxyethyl)methoxyethyl isocyanurate, bis(2-acryloyloxypropyl)-2-ethoxypropyl isocyanurate, bis(2-methacryloyloxypropyl)-2-hydroxypropyl isocyanurate, tris[acryloyldi(oxyethylene)]isocyanurate, and tris[methacryloyldi(oxyethylene isocyanurate] tris[methacryloyldi(oxyethylene)]isocyanurate; and cyanurate compounds of formula (I)' such as tris(acryloyloxyethyl)cyanurate, tris(methacryloyloxyethyl)cyanurate, tris(2-acryloyloxypropyl)cyanurate, tris(2-methacryloyloxypropyl)cyanurate, bis(acryloyloxyethyl)hydroxyethylcyanurate, bis(methacryloyloxyethyl)methoxyethyl cyanurate, bis(2-acryloyloxypropyl)-2-ethoxypropyl cyanurate, bis(2-methacryloyloxypropyl)-2-hydroxypropylcyanurate, and tris[methacryloyldi(oxyethylene)]cyanurate.

The above compounds may be used singly or as a mixture of two or more.

A mixture of the compound of formula (I) with the compound of formula (I)' may also be used in this invention.

The component (B) used together with the component (A) described above in the composition of this invention is selected from the group consisting of component ($b_1$) and component ($b_2$).

Component ($b_1$) is a polyacrylate or polymethacrylate of an oxy- or polyoxy-alkanepolyol, and the polyacrylate or polymethacrylate has a number average molecular weight of about 240 to about 3,000, preferably about 240 to about 1,000. The oxy or polyoxyalkanepolyol of the component ($b_1$) contains at least one ether linkage and at least three hydroxyl groups per molecule, for example, 1 to 3, preferably 1 or 2 ether linkages and 3 to 10, preferably 3 to 8 hydroxyl groups, per molecule. Examples of the oxy- or polyoxyalkanepolyol include diglycerol, triglycerol, tetraglycerol, dipentaglycerol, ditrimethylolpropane, tritrimethylolpropane, tetratrimethylolpropane, dipentaerythritol and tripentaerythritol.

Thus, examples of the component ($b_1$) include diglycerol triacrylate, diglycerol trimethacrylate, diglycerol tetraacrylate, diglycerol tetramethacrylate, ditrimethylolpropane triacrylate, ditrimethylolpropane tetraacrylate, ditrimethylolpropane tetramethacrylate, tritrimethylolpropane triacrylate, tritrimethylolpropane trimethacrylate, tritrimethylolpropane pentacrylate, dipentaerythritol triacrylate, dipentaerythritol trimethacrylate, dipentaerythritol tetraacrylate, dipentaerythritol tetramethacrylate, dipentaerythritol pentaacrylate, dipentaerythritol pentamethacrylate, dipentaerythritol hexaacrylate and dipentaerythritol hexamethacrylate.

These compounds may be used singly or in combination with each other.

The component ($b_2$) is a poly(meth)acrylate of an alkanepolyol containing 4 or more hydroxyl groups. Specific examples include tetramethylolethane triacrylate, tetramethylolethane trimethacrylate, tetramethylolethane tetraacrylate, tetramethylolethane tetramethacrylate, tetramethylolpropane triacrylate, tetramethylolpropane trimethacrylate, tetramethylolpropane tetraacrylate, tetramethylolpropane tetramethacrylate, tetramethylolbutane triacrylate, tetramethylolbutane trimethacrylate, tetramethylolbutane tetraacrylate, tetramethylolbutane tetramethacrylate, pentaerythritol triacrylate, pentaerythritol trimethacrylate, pentaerythritol tetraacrylate, and pentaerythritol tetramethacrylate.

The component ($b_2$) may be used singly or in combination with the component ($b_1$).

In the composition of this invention, the component (B) selected from the group consisting of components ($b_1$) and ($b_2$) is used in an amount of more than 0 to 1,000 parts by weight, preferably 5 to 300 parts by weight, more preferably 10 to 300 parts by weight. When the amount of component (B) is zero, the abrasion resistance, weatherability, and hardness characteristics (e.g., pencil hardness, steel wool abrasion resistance, Taber abrasion resistance and sand falling abrasion resistance) of the coated layer are deteriorated. If its amount exceeds 1,000 parts by weight, the flexibility of the cured coating composition becomes poor, and cracks are likely to form. Accordingly, component (B) is used in the amount specified in this invention.

In addition to the components (A) and (B) described above, the composition of this invention may contain one or more other comonomers or oligomers or prepolymers thereof which are copolymerizable with these components (A) and (B). Examples of the copolymerizable comonomer components are by-products or intermediates in the production of component (A), such as mono(acryloyl- or methacrylol-oxyalkyl)bis(hydroxyalkyl)-cyanurates or isocyanurates), by-products or intermediates in the production of component (b₁) such as mono- or di-acrylates or mono- or di-methacrylates of oxy- or polyoxy-alkane polyols, by-products or intermediates in the production of component (b₂) such as mono- or di-acrylates or mono- or di-methacrylates of alkane polyols containing 4 or more hydroxyl groups, methyl acrylate, methyl methacrylate, ethyl acrylate, ethyl methacrylate, 2-hydroxyethyl acrylate, 2-hydroxyethyl methacrylate, oligomers or prepolymers of methyl acrylate or methacrylate, and oligomers or prepolymers of polyester acrylates.

The amount of such a comonomer component used is about 0 to about 50 parts by weight, preferably about 0 to about 25 parts by weight, per 100 parts by weight of the components (A) and (B) combined.

The essential component (C) constituting the composition of this invention together with the components (A) and (B) is a polymerization initiator capable of curing these components (A) and (B). The component (C) can be properly chosen according to the means of curing the curable coating composition, and may, for example, be selected from radical polymerization initiators, photosensitizers and ionic polymerization initiators. For example, when curing is to be carried out by using ultraviolet irradiation, a photosensitizer can be added as the polymerization initiator. Examples of the photosensitizer include benzoin and its ethers such as benzoin methyl ether, benzoin ethyl ether, benzoin isopropyl ether and benzoin isobutyl ether; benzophenone compounds such as benzophenone, p-chlorobenzophenone and p-methoxybenzophenone; benzil compounds such as benzil, benzil dimethyl ketal and benzil diethyl ketal; and hydroxyalkylphenyl ketone compounds such as 1-(4-isopropylphenyl)-2-hydroxy-2-methyl-1-propanone, 1-phenyl-2-hydroxy-2-methyl-1-propanone and 1-(4-tert-butylphenyl)-2-hydroxy-2-methyl-1-propanone. When curing is to be carried out by heat, a radical initiator can be added. Examples of the radical initiator are azo compounds such as azobisisobutyronitrile; and organic peroxides such as benzoyl peroxide, lauryl peroxide, di-tert-butyl peroxide, dicumyl peroxide and cumene hydroperoxide. It is also possible to incorporate both a photosensitizer and a radical initiator in the curable resin composition of this invention and cure it both by ultraviolet irradiation and heating. Alternatively, the composition can first be cured under ultraviolet irradiation and then under heat. It is further possible to cure the composition first under heat and then by ultraviolet irradiation.

The amount of the component (C) used is 0.01 to 20 parts by weight, preferably 0.1 to 10 parts by weight, per 100 parts by weight of the components (A) and (B) combined. If the amount of the component (C) is smaller than the lower limit, the polymerizability of the composition is reduced, and a cured coating layer having satisfactory hardness is difficult to form. If the amount exceeds the upper limit specified, the cured coating layer will be colored yellow. Hence, the component (C) is used in the amounts within the above-specified range.

The composition of this invention may include an additive in addition to the essential components (A), (B) and (C) described above. Examples of the additive are a filler, a polymerization inhibitor, a solvent, an ultraviolet absorber, an antioxidant, a bleaching agent, etc.

The filler is preferably an inorganic solid filler which does not reduce the excellent transparency of a cured composition obtained by curing the composition of this invention. The amount of the inorganic solid filler as component (D) in this invention is 0 to 200 parts by weight, preferably 0.5 to 100 parts by weight, per 100 parts by weight of the components (A) and (B) combined.

The inorganic solid filler (D) may have any desired average particle size so long as it is in the form of a powder. For example, the powdery filler (D) has an average particle diameter of 1 m$\mu$ to 10$\mu$, preferably 1.5 m$\mu$ to 1$\mu$. To retain the excellent transparency of a cured layer formed from the curable resin composition of this invention, the inorganic powder filler preferably has a refractive index of 1.40 to 1.60, especially 1.42 to 1.58. Examples of the inorganic powdery filler are glass powder, mica, glass beads, glass flakes, diatomaceous earth, anhydrous silica, hydrated silica, silica rock, silica sand, quartz, kaolinite, montmorillonite, sericite, talc, chlorite, potter's stone, and feldspar. There may also be used pre-treated inorganic fillers obtained by surface-treating the above-exemplified filler with alkylcarboxylic acid salts, silane couplers, titanium couplers, $Cl_2Si(CH_3)_2$, alcohols, etc. Colloidal silica, methanol silica sol, ethanol silica sol, isopropanol silica sol, etc. obtained by suspending the aforesaid inorganic fillers in water or alcohols can also be used. Among these inorganic fillers, finely divided silica is preferred because addition of it to the composition of this invention leads to a marked improvement in the surface hardness, scratch resistance and abrasion resistance of the cured layer and does not reduce its transparency and surface luster.

Among the other additives, the polymerization inhibitor may be added to the coating composition of this invention to adjust the rate of polymerization or to increase the storage stability of the composition. The proportion of the polymerization inhibitor may be any which does not impair the properties of a cured layer derived from the composition of this invention, for example, from 0 to 1 part by weight, preferably up to 0.5 part by weight, per 100 parts by weight of the components (A) and (B) combined. Examples of such a polymerization inhibitor are hydroquinone, t-butylhydroquinone, hydroquinone monomethyl ether, t-butylcatechol, phenothiazine and $\alpha$-naphthol.

The solvent as the other additive may be added to the composition of this invention in order to adjust the viscosity of the composition during preparation or in a coating operation, or to increase wetting with respect to a substrate to be coated. Examples of the solvent include hydrocarbons such as benzene, toluene, xylene, cumene, ethylbenzene, hexane, heptane, octane, petroleum ether, ligroin, cyclohexane and methylcyclohexane; halogenated hydrocarbons such as methylene chloride, chloroform, carbon tetrachloride, bromoform, trichloroethylene, ethylene dichloride, perchloroethylene, trichloroethane, tetrachloroethane, propylene dichloride, chlorobenzene and bromobenzene; alcohols such as methanol, ethanol, isopropanol, butanol, pentanol, hexanol, cyclohexanol, ethylene glycol, propylene glycol, glycerol, ethylene glycol monomethyl ether and diethylene glycol; ketones such as acetone, methyl ethyl ketone, methyl isobutyl ketone and cyclohexanone; ethers such as diethyl ether, dipropyl ether, butyl ethyl ether, dibutyl ether, ethylene glycol dimethyl ether and diethylene glycol dimethyl ether; nitriles such as acetonitrile, propionitrile and capronitrile; and esters such as methyl formate, ethyl formate, methyl acetate, ethyl acetate, propyl acetate, isobutyl acetate, butyl acetate, pentyl acetate, methyl benzoate and ethyl benzoate.

The amount of the solvent used is, for example, 0 to 3,000 parts by weight, preferably 5 to 3,000 parts by weight, more preferably 10 to 2,000 parts by weight, per 100 parts by weight of the components (A) and (B) combined.

Examples of the ultraviolet absorber as the other additive include CYASORB®UV9 (2-hydroxy-4-methoxybenzophenone), CYASORB®UV5411 [2-(hydroxy-5-t-octylphenyl)benzotriazole], VIOSORB®90 (p-t-butylphenyl salicylate), SANOL®LS-770 [bis(2,2',6,6'-tetramethyl-4-piperidine)sebacate] and TINUVIN®320 [2-(2'-hydroxy-3',5'-di-t-butylphenyl-benzotriazole]. The amount of the ultraviolet absorber can be properly chosen. For example, it is 0 to 20 parts by weight, preferably 0 to 10 parts by weight, per 100 parts by weight of the components (A) and (B) combined.

Examples of the antioxidant as the other additive are 2,2'-methylenebis(4-methyl-6-t-butylphenol), 3,5-di-t-butyl-4-hydroxytoluene, 2-t-butyl-4-methoxyphenol, 3,5-di-t-butyl-4-hydrobenzylphosphoric acid distearyl ester, and triphenyl phosphite. The amount of the antioxidant used can be properly chosen. For example, it is 0 to 1 part by weight, preferably 0 to 0.5 part by weight, per 100 parts by weight of the components (A) and (B) combined.

Examples of the bleaching agent as the other additive include titanium white and bis-styryltriazole. The amount of the bleaching agent used is, for example, 0 to about 10 parts by weight, preferably 0 to 5 parts by weight, per 100 parts by weight of the components (A) and (B) combined.

Various methods can be employed to prepare the curable coating composition of this invention. For example, the components (A), (B) and (C) and as required, the aforesaid additives are mixed and kneaded by using suitable mixing means such as a roll, a Bunbury mixer, a ball mill, an attriter, a whipper, an oaks mixer, a dissolver, a homogenizer, a colloid mill, a sand mill, a vibratory mill, a mixer, a stirring mixing tank, etc. to form the composition of this invention in the form of a uniform solution or dispersion.

The curable coating composition of this invention can be coated on a substrate to form a coated film by conventional known methods. For example, this can be achieved by washing the surface of a substrate with a suitable solvent, optionally drying it, pre-treating the cleaned substrate by a known method, coating the composition of this invention on the surface of the substrate, optionally drying it, and then curing it. The drying and curing steps after the coating may be carried out simultaneously.

The individual steps of coating will be briefly described below by way of illustration only.

The cleaning of the surface of the substrate may be carried out by known methods, for example, by washing it with various solvents, an aqueous alkaline solution or a surface-active agent, or by sonication, electrolysis or blasting. The pre-treatment of the surface of the substrate may be carried out, for example, by sand blasting, an etching treatment with an acid or alkali, a flaming treatment, a corona discharge treatment, an arc discharge treatment, a glow discharge treatment, a plasma discharge treatment, a primer treatment, a chemical treatment, etc.

In the primer treatment, primers generally used as adhesives may be used. Examples include epoxy resins, cyanoacrylates, polyamide-epoxy resins, nitrile rubbers, chloroprene rubber, chlorinated polyolefins, phenol/formaldehyde resin, and polyurethan. There can be also be used a copolymer of ethylene with a monolefin such as propylene, 1-butene, 4-methyl-1-pentene, acrylic or methacrylic acid, methyl acrylate or methacrylate, vinyl chloride, or styrene, or a polymer obtained by modifying such an ethylene copolymer with maleic anhydride, trivinylmethoxysilane, vinyl tris($\beta$-methoxyethoxy)silane, $\gamma$-glycidoxypropyl trimethoxy silane, or 4-(meth)acryloylethyltrimellitic anhydride, as a solution in toluene or trichloroethane.

When the substrate is a polyolefin, the primer is preferably a modified polyolefin having grafted thereto an $\alpha,\beta$-unsaturated carboxylic acid or its derivative such as its acid anhydride or ester.

The curable coating composition of this invention containing the components (A), (B) and (C) as essential components may be coated on the surface of a substrate by various methods, for example by spraying, dipping, bar coating, roll coating, spin coating, or gel coating. The drying of the coated film may be carried out, for example, by a natural drying method in which the solvent is removed at room temperature for about 1 minute to about 1 hour, a forced drying method in which the drying is carried out for about 1 minute to about 30 minutes using nitrogen gas or air heated to about 100° C. from room temperature, a heat drying method using an infrared or far infrared ray furnace, or by a heat drying method using a hot air furnace in which the coated substrate is heated from room temperature to about 200° C. for about 1 second to about 30 minutes in an ultraviolet light furnace, etc.

The coated film can be cured by various methods, for example a method of curing by light, in which light is irradiated, for example, at about $-10°$ C. to about 150° C. preferably about 5 to about 130° C. for about 1 second to about 1 hour, in the air or in an inert gas atmosphere or in an air-shut off condition using such a light source as a carbon arc lamp, a xenon lamp, a low-pressure mercury lamp, a high-pressure mercury lamp, an ultrahigh pressure mercury lamp or a metal halide lamp; a method of curing by heat in which the coated film is heated to about $-10°$–about 300° C. for about 0.05 second to about 10 hours, preferably for about 0.1 second to about 8 hours in air, in an inert gas atmosphere, or in an air-shut off condition; a method of curing by electron beams, in which electron beams are irradiated at room temperature to about 100° C. for about 0.1 second to about 30 minutes in the air or in an inert gas atmosphere; and a method of curing by ionizing radiation from $Co^{60}$, etc. A suitable method may be selected form these examples depending upon the type of the substrate and the types of the individual components of the coating composition of this invention.

The thickness of the cured coated film prepared from the uncured filled coating composition of this invention may be suitably selected; for example, it is about 0.1 micron to about 50 microns, preferably about 2 microns to about 20 microns.

The type of the substrate which is to be coated with the composition of this invention is not particularly limited, and various plastics such as thermoplastic resins and thermosetting resins, metals, ceramics and other materials can be conveniently used. Preferably, the coating composition of this invention is coated on the surface of a molded article of a thermoplastic resin. The substrate may be in any shape such as a film, sheet, plate, etc. Examples of the thermoplastic resin constituting the substrate are polyolefins such as homopolymers of α-olefins and copolymers composed of α-olefins as a major component, polyacrylate resins, polycarbonate resins, polyester resins and polyamide resins. The polyolefins, polyacrylate resins and polycarbonate resins are preferred, and the polyolefins are especially preferred.

Specific examples of the polyolefins include homopolymers of α-olefins having 2 to 15 carbon atoms such as ethylene propylene, 1-butene, 1-hexene, 4-methyl-1-pentene, 1-octene and 1-decene copolymers of the above α-olefins with each other, and copolymers of a major proportion of the above α-olefins with a minor proportion (for example, not more than 30 mole%) of other components, for example, a vinyl ester of a lower aliphatic carboxylic acid such as vinyl acetate and vinyl propionate, and esters and metal salts of acrylic carboxylic acids, such as methyl acrylate, metal salts of acrylic acid, methyl methacrylate and metal salts of methacrylic acid. Among the above polyolefins, those having crystallinity are preferred.

Examples of the polyacrylate resins are homopolymers and copolymers of monomers of the acrylic carboxylic acid ester type, such as methyl acrylate, ethyl acrylate, methyl methacrylate and ethyl methacrylate. Among these polyacrylate resins, poly(methyl methacrylate) is preferred.

As the polycarbonate resin, bisphenol A polycarbonate can be cited as an example.

Specific examples of the polyester resin are polyethylene terephthalate, polytetramethylene terephthalate, a cocondensate of bisphenol A, isophthalic acid and terephthalic acid, and a polycondensate of hydroxybenzoic acid.

Specific examples of the polyamide resin include nylon 6, nylon 6.6, nylon 10, and nylon 12.

Other examples of the plastics which constitute the substrate to be coated with the composition of this invention are polyacetal, polystyrene, an acrylonitrile/styrene copolymer, an acrylonitrile/butadiene/styrene copolymer, polysulfone resins, polyphenylene oxide, modified polyphenylene oxide, polyphenylene sulfide resin and polyether sulfone resin.

Specific examples of the thermosetting resin which constitute the substrate to be coated with the composition of this invention are unsaturated polyesters, epoxy resins, diallyl phthalate, and polyallyl glycol carbonate resin.

Examples of the metals constituting the substrate to be coated with the composition of this invention are aluminum, iron, and stainless steel.

According to this invention, there can be provided a cured coating composition prepared by curing the curable coating composition composed of the components (A), (B), (C) and (D) specified in claim 1 of the present application.

The invention can further provide a process for producing an article having a cured coating layer, which comprises applying the curable coating composition composed of the components (A), (B), (C) and (D) specified in claim 1 to the surface of a substrate and then curing the composition on the substrate.

The articles having a cured coating layer in accordance with this invention may be in various forms. Examples include lighting panels, sky domes, panels of solar water heaters, panels of gurabu boxes, glass plates of watches and clocks, various lenses for eyeglasses, cameras, contact lenses, optical prisms, blood bags, shower domes or coffee containers of coffee makers, covers for water tanks and lighting devices, covers of stereophonic systems such as players, display panels or covers of various meters, covers of headlights or tail lamps of automobiles, level sensors, various films such as films for preventing scattering of glass, mold releasing films, insulating films, and agricultural films, light-reproducing type videodiscs, viewing windows of various devices such as garment dryers, electric washers, dryers and oil tanks, windshield glasses of autocycles, jeeps and motor boats, glasses for automobiles (such as front glasses, rear window, opera window, triangular window, and sun roofs), windowpanes of greenhouses, houses and water tanks, tableware, mirrors various containers such as those for seasonings or cosmetics, relay cases, fuse boxes, side covers or mudguards of bicycles, fenders, curtains, screens, table cloths, waterproof and moistureproof films, waterproof sheets, floor tiles, floor sheets, doors, table plates, wall tiles, counter top decorative plates, shelves, wall sheets, wallpapers, furniture, light-weight wall plates, chairs and seats, bath tabs, toilet stools, refrigerators, wall panels, water supply and drainage pipes, wiring pipes, ducts, curtain rods, rain troughs, heat insulating materials, waterproofing materials for coated films, window sashes, automobile wheels, interior finishing materials for automobiles, flower boxes, aparticle boards, roof tiles, shutters, gear cams, knobs, electromagnetic valve frames, fans, bumpers and brakes. The artilces may be used in various fields as parts of household electrical appliances, automotive parts, autocycle parts, automatic vendor parts, architectural and civil engineering materials, general industrial materials, business and information machines and appliances, electronics component parts, packaging materials, sporting goods, medical instruments, and parts related to nuclear powder.

The following examples illustrate the present invention more specifically. The various properties in the present application were measured by the following methods.

(1) Refractive index

A sample, fully dried, was added to a concentration of 2% by weight to each of liquids having known refractive indices, and fully dispersed. The transparency of the dispersion was examined visually, and the refractive index of the liquid which looked most transparent was defined as the refractive index of the sample.

(2) Surface gloss

Measured in accordance with the method of 60° specular gloss in accordance with JIS K 5400-1979.

(3) Light transmittance

Measured in accordance with JIS K-6714.

(4) Adhesion

Measured in accordance with a crosscut tape test described in JIS K-5400-1979. The result was evaluated by the number of squares which remained adhering per 100 squares.

(5) Sand falling abrasion resistance

In accordance with the method of JIS T 8147-1975, a silicon carbide abrasive material weighing 800 g was let fall onto the coated layer. The abrasion resistance is defined as the difference of surface glosses before and after the testing. Smaller values show higher abrasion resistances.

(6) Taber abrasion

In accordance with the method of ASTM D-1044, an abrasive wheel CS-10 was caused to rotate 1000 turnes on the coated layer at a load of 500 g. The abrasion resistance is defined as the amount of the coated layer abraded after the testing. Smaller amounts of abrasion show higher abrasion resistances.

(7) Steel wool abrasion

A fixed load (in g/cm$^2$) was exerted on a No. 000 steel wool, and reciprocated 100 times over a sample with a stroke of 50 mm. The minimum load under which the surface of the sample was scratched is defined as steel wool abrasion resistance.

(8) Pencil hardness

Measured in accordance with JIS K-5651.

(9) Flexibility

A rectangular test specimen, 5 mm wide and 10 cm long, was bent along the peripheral surface of a cylindrical rod having a diameter of 2 cm, and the angle of bending at the time when the coated layer cracked or peeled from the substrate was determined. Larger angles mean better flexibility.

(10) Water resistance

A test specimen was immersed in pure water at 40° C. for 240 hours, and then the appearance and adhesion of the coated layer were evaluated.

(11) Heat resistance

A test specimen was maintained for 400 hours in a Geer's aging tester at 80° C., and then the appearance and adhesion of the coated layer of the specimen were evaluated.

(12) Resistance to volatile oil

A test specimen was immersed in petroleum benzin at room temperature for 24 hours, and then the appearance and adhesion of the coated layer of the specimen were evaluated.

(13) Gasoline resistance

A test specimen was immersed in regular gasoline at room temperature for 24 hours, and then the appearance and adhesion of the coated layer of the specimen were evaluated.

(14) Heat cycle resistance

A test specimen was maintained in an air oven at 80° C. for 2 hours, and then allowed to stand at room temperature for 1 hour, then maintained in a low temperature chamber at −30° C. for 2 hours, and then allowed to stand at room temperature for 1 hour. This cycle was repeated 10 times. The coated layer of the test specimen was visually observed for a change in appearance, and its adhesion was also evaluated.

(15) Weatherability

A test specimen was maintained in a Sunshine Weathermeter for 400 hours, and then the appearance and adhesion of the coated layer of the specimen were evaluated.

EXAMPLE 1

A 500 ml four-necked flask was charged with 85 g of tris(acryloyloxyethyl)isocyanurate, 10 g of dipentaerythritol tetraacrylate, 5 g of dipentaerythritol pentaacrylate, 5 g of benzoin isopropyl ether and 110 g of toluene, and the mixture was stirred at room temperature for 1 hour to form a transparent coating composition (A).

A square plate (thickness 3 mm) injection-molded from polypropylene (Mitsui Petrochemical Polypro SJ-313, a tradename for a product of Mitsui Petrochemical Industries, Ltd.) was exposed for 1 minute to a vapor of 1,1,1-trichloroethane, and then dried at room temperature for 1 minute. Then, the square plate was immersed for 20 seconds in a toluene solution (B) of maleic anhydride-modified PER (propylene content 67 mole%, maleic anhydride content 6% by weight) in a concentration of 15 g/liter, and pulled up slowly. It was dried at room temperature for 5 minutes, and then dried at 80° C. for 30 minutes. The polypropylene square plate subjected to a primer treatment was dipped for 30 seconds in the coating composition (A), pulled up slowly and dried at 60° C. for 5 minutes. The resulting test specimen was exposed to ultraviolet radiation for 30 seconds from a 1.5 KW high-pressure mercury lamp (120 W/cm) disposed at a distance of 15 cm from the specimen to cure the coated layer.

The properties of the coated layer are shown in Table 1.

EXAMPLES 2 TO 7

In each run, a test specimen was prepared in the same way as in Example 1 except that a coating composition prepared by using the poly[(meth)acryloyloxyalkyl]isocyanurates, polyoxyalkanepolyol polyacrylates, photosensitizers and solvents indicated in Table 1 in the amounts indicated was used instead of the coating composition (A). The test specimen was tested, and the results are shown in Table 1.

EXAMPLES 8 TO 12 AND COMPARATIVE EXAMPLES 1 TO 3

The monomers, photosensitizer, solvent and methanol silica sol (anhydrous silica suspended in methanol in a concentration of 30%, having an average particle diameter of about 15 mμ and a refractive index of about 1.50, a product manufactured by Nissan Chemical Co., Ltd.) were weighed in the amounts indicated in Table 1, and mixed with stirring at room temperature for 2 hours to prepare a coating composition (A).

On the other hand, the same polypropylene square plate as used in Example 1 was washed with a vapor of 1,1,1-trichloroethane for 30 seconds, dried at room temperature for 1 minute, and dipped for 30 seconds in the coating composition (A). The dipped plate was slowly pulled up and then dried at 60° C. for 5 minutes. The test specimen obtained was photopolymerized by the method described in Example 1 to cure its coated layer. The results are shown in Table 1.

COMPARATIVE EXAMPLES 4 AND 5

In each run, the poly(acryloyloxyalkyl)isocyanurate, polyoxyalkanepolyol polyacrylate, photosensitizer and solvent indicated in Table 1 were weighed in the amounts indicated in Table 1, and mixed with stirring at room temperature for 1 hour to form a coating composition (A). A test specimen of polypropylene with a coated surface was prepared by the same method as described in Example 1 except that the above-prepared coating composition (A) was used. The results are shown in Table 1.

COMPARATIVE EXAMPLE 6

The properties of the polypropylene (Mitsui Petrochemical Polypro SJ313, a tradename for a product of Mitsui Petrochemical Industries, Ltd.) itself not coated with the coating composition of this invention are shown in Table 1.

In the following tables, the following abbreviations were used.

TAEIC: tris(acryloyloxyethyl)isocyanurate

BAEIC: bis(acryloyloxyethyl)hydroxyethyl isocyanurate
TMEIC: tris(methacryloyloxyethyl)isocyanurate
TEPIC: acrylic acid-modified product of tris(2-epoxypropyl)isocyanurate
DPTA: dipentaerythritol tetraacrylate
DPPA: dipentaerythritol pentaacrylate
DPHA: dipentaerythritol hexaacrylate
DGTA: diglycerol tetraacrylate
PETRA: pentaerythritol triacrylate
PETA: pentaerythritol tetraacrylate
TMPTA: trimethylolpropane triacrylate
MMA: methyl methacrylate
BISA: an acrylic acid-modified product of Epikote 834®
BIE: benzoin isopropyl ether
IHP: 1-(4-isopropylphenyl)-2-hydroxy-2-methyl-1-propanone

TABLE 1

|  |  | Example 1 | Example 2 | Example 3 |
|---|---|---|---|---|
| Coating composition |  |  |  |  |
| Poly[(meth)acryloyloxyalkyl] (iso)cyanurate (A) | Amount (g) | TAEIC 85 | TAEIC TMEIC 75 10 | TAEIC BAEIC 68 17 |
| Polyacrylate of poly(oxy)alkanepolyol (B) | Amount (g) | DPTA DPPA 10 5 | DPTA DPPA 10 5 | DPPA DPHA 10 5 |
| Polymerization initiator (C) | Amount (g) | BIE 5 | BIE 5 | BIE 5 |
| Inorganic solid filler (D) | Type | — | — | — |
|  | Particle size (mμ) | — | — | — |
|  | Amount (g) | 0 | 0 | 0 |
| Solvent | Type | Toluene | Toluene | Toluene |
|  | Amount (g) | 110 | 110 | 110 |
| Polymerization time (sec) |  | 30 | 30 | 30 |
| Properties of the coated layer |  |  |  |  |
| Film thickness (μ) |  | 10 | 9 | 8 |
| Surface gloss |  | 91 | 90 | 93 |
| Adhesion (per 100) |  | 100 | 100 | 100 |
| Sand falling abrasion (Δ gloss) |  | 48 | 55 | 27 |
| Taber abrasion (Δ mg) |  | 11 | 10 | 8 |
| Steel wool abrasion (g/cm$^2$) |  | 350 | 350 | 350 |
| Pencil hardness |  | B | B | B |
| Flexibility (degrees) |  | 25 | 20 | 25 |
| Water resistance | Appearance | No change | No change | No change |
|  | Adhesion | 100 | 100 | 100 |
| Heat resistance | Appearance | No change | No change | No change |
|  | Adhesion | 100 | 100 | 100 |
| Volatile oil resistance | Appearance | No change | No change | No change |
|  | Adhesion | 100 | 100 | 100 |
| Gasoline resistance | Appearance | No change | No change | No change |
|  | Adhesion | 100 | 100 | 100 |
| Heat cycle resistance | Appearance | No change | No change | No change |
|  | Adhesion | 100 | 100 | 100 |
| Weatherability | Appearance | No change | No change | No change |
|  | Adhesion | 100 | 100 | 100 |

|  |  | Example 4 | Example 5 | Example 6 |
|---|---|---|---|---|
| Coating composition |  |  |  |  |
| Poly[(meth)acryloyloxyalkyl] (iso)cyanurate (A) | Amount (g) | TAEIC BAEIC 68 17 | TAEIC BAEIC 35 35 | TAEIC BAEIC 68 17 |
| Polyacrylate of poly(oxy)alkanepolyol (B) | Amount (g) | DPHA 15 | DGTA 30 | DPHA 15 |
| Polymerization initiator (C) | Amount (g) | BIE 5 | BIE 5 | IHP 5 |
| Inorganic solid filler (D) | Type | — | — | — |
|  | Particle size (mμ) | — | — | — |
|  | Amount (g) | 0 | 0 | 0 |
| Solvent | Type | Toluene | Toluene | Toluene |
|  | Amount (g) | 110 | 110 | 110 |
| Polymerization time (sec) |  | 30 | 30 | 30 |
| Properties of the coated layer |  |  |  |  |
| Film thickness (μ) |  | 8 | 7 | 8 |
| Surface gloss |  | 94 | 91 | 93 |
| Adhesion (per 100) |  | 100 | 100 | 100 |
| Sand falling abrasion (Δ gloss) |  | 31 | 28 | 25 |
| Taber abrasion (Δ mg) |  | 8 | 13 | 11 |
| Steel wool abrasion (g/cm$^2$) |  | 360 | 300 | 360 |
| Pencil hardness |  | B | 2B | B |
| Flexibility (degrees) |  | 20 | 30 | 20 |
| Water resistance | Appearance | No change | No change | No change |
|  | Adhesion | 100 | 100 | 100 |
| Heat resistance | Appearance | No change | No change | No change |
|  | Adhesion | 100 | 100 | 100 |
| Volatile oil resistance | Appearance | No change | No change | No change |
|  | Adhesion | 100 | 100 | 100 |
| Gasoline resistance | Appearance | No change | No change | No change |
|  | Adhesion | 100 | 100 | 100 |
| Heat cycle resistance | Appearance | No change | No change | No change |
|  | Adhesion | 100 | 100 | 100 |
| Weatherability | Appearance | No change | No change | No change |

TABLE 1-continued

|  |  |  |  |  |
|---|---|---|---|---|
|  | Adhesion | 100 | 100 | 100 |
|  |  | Example 7 | Example 8 | Example 9 |
| Coating composition |  |  |  |  |
| Poly[(meth)acryloyloxyalkyl] (iso)cyanurate (A) | Amount (g) | TAEIC BAEIC 50 20 | TAEIC BAEIC 80 5 | TAEIC BAEIC 68 17 |
| Polyacrylate of poly(oxy)alkanepolyol (B) | Amount (g) | DPHA 30 | DPHA 15 | DPHA 15 |
| Polymerization initiator (C) | Amount (g) | IHP 5 | IHP 5 | IHP 5 |
| Inorganic solid filler (D) | Type | — | Methanol silica sol | Methanol silica sol |
|  | Particle size (mμ) | — | 15 | 15 |
|  | Amount (g) | 0 | 33(SiO$_2$ 10 g) | 83(SiO$_2$ 25 g) |
| Solvent | Type | Toluene | 1,1,1-trichloro-ethane/n-butanol | 1,1,1-trichloro-ethane/n-butanol |
|  | Amount (g) | 110 | 115/84 | 170/94 |
| Polymerization time (sec) |  | 30 | 30 | 30 |
| Properties of the coated layer |  |  |  |  |
| Film thickness (μ) |  | 7 | 8 | 7 |
| Surface gloss |  | 93 | 94 | 96 |
| Adhesion (per 100) |  | 100 | 100 | 100 |
| Sand falling abrasion (Δ gloss) |  | 30 | 20 | 15 |
| Taber abrasion (Δ mg) |  | 8 | 2 | 1 |
| Steel wool abrasion (g/cm$^2$) |  | 380 | 400 | 400 |
| Pencil hardness |  | B | HB | HB |
| Flexibility (degrees) |  | 20 | 20 | 20 |
| Water resistance | Appearance | No change | No change | No change |
|  | Adhesion | 100 | 100 | 100 |
| Heat resistance | Appearance | No change | No change | No change |
|  | Adhesion | 100 | 100 | 100 |
| Volatile oil resistance | Appearance | No change | No change | No change |
|  | Adhesion | 100 | 100 | 100 |
| Gasoline resistance | Appearance | No change | No change | No change |
|  | Adhesion | 100. | 100 | 100 |
| Heat cycle resistance | Appearance | No change | No change | No change |
|  | Adhesion | 100 | 100 | 100 |
| Weatherability | Appearance | No change | No change | No change |
|  | Adhesion | 100 | 100 | 100 |
|  |  | Example 10 | Example 11 | Example 12 |
| Coating composition |  |  |  |  |
| Poly[(meth)acryloyloxyalkyl] (iso)cyanurate (A) | Amount (g) | TAEIC BAEIC 45 15 | TAEIC 80 | TAEIC BAEIC 75 5 |
| Polyacrylate of poly(oxy)alkanepolyol (B) | Amount (g) | DPPA DPPA 10 30 | PETRA PETA 5 15 | PETA 20 |
| Polymerization initiator (C) | Amount (g) | IHP 5 | IHP 5 | IHP 5 |
| Inorganic solid filler (D) | Type | Methanol silica sol | Methanol silica sol | Methanol silica sol |
|  | Particle size (mμ) | 15 | 15 | 15 |
|  | Amount (g) | 83(SiO$_2$ 25 g) | 83(SiO$_2$ 25 g) | 83(SiO$_2$ 25 g) |
| Solvent | Type | 1,1,1-trichloro-ethane/n-butanol | 1,1,1-trichloro-ethane/n-butanol | 1,1,1-trichloro-ethane/n-butanol |
|  | Amount (g) | 170/94 | 170/94 | 170/94 |
| Polymerization time (sec) |  | 30 | 30 | 30 |
| Properties of the coated layer |  |  |  |  |
| Film thickness (μ) |  | 7 | 7 | 7 |
| Surface gloss |  | 95 | 93 | 95 |
| Adhesion (per 100) |  | 100 | 100 | 100 |
| Sand falling abrasion (Δ gloss) |  | 18 | 26 | 20 |
| Taber abrasion (Δ mg) |  | 1 | 3 | 2 |
| Steel wool abrasion (g/cm$^2$) |  | 450 | 400 | 400 |
| Pencil hardness |  | HB | HB | HB |
| Flexibility (degrees) |  | 15 | 20 | 15 |
| Water resistance | Appearance | No change | No change | No change |
|  | Adhesion | 100 | 100 | 100 |
| Heat resistance | Appearance | No change | No change | No change |
|  | Adhesion | 100 | 100 | 100 |
| Volatile oil resistance | Appearance | No change | No change | No change |
|  | Adhesion | 100 | 100 | 100 |
| Gasoline resistance | Appearance | No change | No change | No change |
|  | Adhesion | 100 | 100 | 100 |
| Heat cycle resistance | Appearance | No change | No change | No change |
|  | Adhesion | 100 | 100 | 100 |
| Weatherability | Appearance | No change | No change | No change |
|  | Adhesion | 100 | 100 | 100 |
|  |  | Comparative Example 1 | Comparative Example 2 | Comparative Example 3 |
| Coating composition |  |  |  |  |
| Poly[(meth)acryloyloxyalkyl] (iso)cyanurate (A) | Amount (g) | TAEIC 20 | TAEIC 70 | TEPIC 50 |

TABLE 1-continued

| | | | | |
|---|---|---|---|---|
| Polyacrylate of poly(oxy)alkanepolyol (B) | Amount (g) | HMA 80 | TMPTA 30 | BISA 50 |
| Polymerization initiator (C) | Amount (g) | IHP 5 | IHP 5 | IHP 5 |
| Inorganic solid filler (D) | Type | Methanol silica sol | Methanol silica sol | Methanol silica sol |
| | Particle size (mμ) | 15 | 15 | 15 |
| | Amount (g) | 83($SiO_2$ 25 g) | 83($SiO_2$ 25 g) | 83($SiO_2$ 25 g) |
| Solvent | Type | 1,1,1-trichloro-ethane/n-butanol | 1,1,1-trichloro-ethane/n-butanol | 1,1,1-trichloro-ethane/n-butanol |
| | Amount (g) | 150/94 | 170/94 | 170/94 |
| Polymerization time (sec) | | 120 | 60 | 60 |
| Properties of the coated layer | | | | |
| Film thickness (μ) | | 6 | 7 | 8 |
| Surface gloss | | 88 | 94 | 92 |
| Adhesion (per 100) | | 98 | 100 | 85 |
| Sand falling abrasion (Δ gloss) | | 56 | 30 | 30 |
| Taber abrasion (Δ mg) | | 20 | 15 | 20 |
| Steel wool abrasion (g/cm$^2$) | | <60 | 160 | 100 |
| Pencil hardness | | 3B | 4B | 5B |
| Flexibility (degrees) | | 30 | 15 | 30 |
| Water resistance | Appearance | No change | No change | No change |
| | Adhesion | 100 | 100 | 100 |
| Heat resistance | Appearance | No change | No change | No change |
| | Adhesion | 100 | ·100 | 100 |
| Volatile oil resistance | Appearance | No change | No change | Blister formed |
| | Adhesion | 100 | 100 | 95 |
| Gasoline resistance | Appearance | No change | No change | No change |
| | Adhesion | 100 | 100 | 100 |
| Heat cycle resistance | Appearance | No change | No change | No change |
| | Adhesion | 100 | 100 | 100 |
| Weatherability | Appearance | No change | No change | Yellowing |
| | Adhesion | 95 | 90 | 75 |

| | | Comparative Example 4 | Comparative Example 5 | Comparative Example 6 |
|---|---|---|---|---|
| Coating composition | | | | |
| Poly[(meth)acryloyloxyalkyl](iso)cyanurate (A) | Amount (g) | TAEIC 5 | TAEIC 85 | — |
| Polyacrylate of poly(oxy)alkanepolyol (B) | Amount (g) | DPHA 95 | DPTA DPPA 10  5 | — |
| Polymerization initiator (C) | Amount (g) | IHP 5 | 0 | — |
| Inorganic solid filler (D) | Type | — | — | — |
| | Particle size (mμ) | — | — | — |
| | Amount (g) | 0 | 0 | — |
| Solvent | Type | Toluene | Toluene | — |
| | Amount (g) | 110 | 110 | — |
| Polymerization time (sec) | | 30 | 30 | — |
| Properties of the coated layer | | | | |
| Film thickness (μ) | | 8 | Did not cure | — |
| Surface gloss | | 90 (crack formed) | | 20 |
| Adhesion (per 100) | | 100 | | — |
| Sand falling abrasion (Δ gloss) | | 51 | | — |
| Taber abrasion (Δ mg) | | 10 | | — |
| Steel wool abrasion (g/cm$^2$) | | 500 | | — |
| Pencil hardness | | HB | | 6B |
| Flexibility (degrees) | | <5 | | — |
| Water resistance | Appearance | | | |
| | Adhesion | | | |
| Heat resistance | Appearance | | | |
| | Adhesion | | | |
| Volatile oil resistance | Appearance | | | |
| | Adhesion | | | |
| Gasoline resistance | Appearance | | | |
| | Adhesion | | | |
| Heat cycle resistance | Appearance | | | |
| | Adhesion | | | |
| Weatherability | Appearance | | | |
| | Adhesion | | | |

EXAMPLE 13

A 3 mm-thick injection-molded sheet of poly(4-methyl-1-pentene) (TPX MX004, a tradename for a product of Mitsui Petrochemical Industries, Ltd.) was dipped for 10 seconds in a 1,1,1-trichloroethane solution of maleic anhydride-modified EPR (maleic anhydride content 7.7% by weight) in a concentration of 15 g/liter to form a primer on its surface. The sheet was left to stand at room temperature for 5 minutes, and then dipped for 10 seconds in the coating composition prepared in Example 9, dried at 60° C. for 5 minutes, and then photopolymerized by the method described in Example 9 to form a test specimen consisting of poly(4-methyl-1-pentene) and a cured coated layer. The results are shown in Table 2.

EXAMPLES 14 AND 15 AND COMPARATIVE EXAMPLES 7 TO 9

Test specimens were produced in the same way as in Example 13 except that each of the substrate polymers indicated in Table 2 was used and pre-treated as described in Table 2. The results are shown in Table 2 (Examples 14 and 15).

The properties of the substrate polymers used in Examples 13 to 15, which were not coated with the coating composition of this invention, are shown in Table 2.

The properties of the coated film are shown in Table 3 (Comparative Example 11).

The properties of a polyethylene terephthalate film not coated with the coating composition of this invention are shown in Table 3 (Comparative Example 12).

TABLE 3

|  | Example 16 | Comparative Example 10 | Comparative Example 11 | Comparative Example 12 |
|---|---|---|---|---|
| Film thickness (μ) | 3 | 3 | 3 | — |
| Light transmittance (%) | 90 | 90 | 90 | 89 |
| Haze (%) | 1 | 1 | 1 | — |
| Initial adhesion (cellophane tape peeling) | Acceptable | Acceptable | Acceptable | — |
| Sand falling abrasion (Δ Haze %) | 10 | 30 | 27 | 45 |
| Steel wool abrasion (g/cm²) | 500 | 100 | 100 | <60 |
| Pencil hardness | 3H | H | H-2H | H |

TABLE 2

|  | Example 13 | Example 14 | Example 15 | Comparative Example 7 | Comparative Example 8 | Comparative Example 9 |
|---|---|---|---|---|---|---|
| Substrate polymer | Poly(4-methyl-1-pentene) (TPX MX004) | Polycarbonate (Panlite L-1250, a product of Teijin Chemical Co., Ltd.) | Poly(methyl methacrylate) (Acrylite L, a product of Mitsubishi Rayon Co., Ltd.) | TPX MX004 | Panlite L-1250 | Acrylite L |
| Pre-treatment | Primer treatment | Degreasing with isopropyl alcohol | Degreasing with ethyl acetate | — | — | — |
| Film thickness (μ) | 8 | 9 | 9 | — | — | — |
| Light transmittance (%) | 94 | 92 | 93 | 92 | 90 | 92 |
| Adhesion (per 100) | 100 | 100 | 100 | — | — | — |
| Taber abrasion (Δ mg) | 1 | 1 | 1 | 10 | 5 | 5 |
| Pencil hardness | HB | 2H | 8H | 3B | B | 3H |

EXAMPLE 16 AND COMPARATIVE EXAMPLES 10 TO 12

A 1-liter four-necked flask was charged with 30 g of tris(acryloyloxyethyl)isocyanurate, 70 g of dipentaerythritol hexaacrylate, 5 g of 1-(4-isopropylphenyl)-2-hydroxy-2-methyl-1-propane, 83 g of methanol silica sol and 460 g of n-butanol, and the temperature was raised to 40° C. The mixture was stirred for 3 hours, and then with stirring, cooled to room temperature to prepare a transparent coating composition (A).

Separately, a polyethylene tetraphthalate film (Lumirror® T-60, a tradename for a product of Toray Inc.) was wiped fully with a gauze impregnated with 1,4-dioxane, and dried at room temperature for 2 minutes. Then, the coating composition (A) was coated on the surface of the film by an applicator. The coated film was dried at room temperature for 5 minutes, dried at 60° C. for 5 minutes, and exposed to ultraviolet irradiation for 20 seconds by using a 1.5 KW high-pressure mercury lamp (120 W/cm) disposed 10 cm away from the film. The properties of the coated film are shown in Table 3 (Example 16).

A test specimen with a coated surface was prepared in the same way as in Example 16 except that in the preparation of the coating composition (A), the amount of tris(acryloyloxyethyl)isocyanurate was changed to 70 g, 30 g of trimethylolpropane triacrylate was used instead of 70 g of dipentaerythritol hexaacrylate, and methanol silica sol was not added. The properties of the coated film are shown in Table 3 (Comparative Example 10).

A test specimen with a coated surface was prepared in the same way as in Example 16 except that in the preparation of the coating composition (A), the amount of tris(acryloyloxyethyl)isocyanurate was changed to 70 g, and 30 g of trimethylolpropane triacrylate was used instead of 70 g of dipentaerythritol hexaacrylate.

What is claimed is:

1. In a curable coating composition comprising an acryloyl or methacryloyl isocyanurate compound, an acrylic or methacrylic ester compound and a polymerization initiator capable of curing said components; the improvement wherein said composition is composed of
(A) 100 parts by weight of at least one acryloyl- or methacryloyl-oxyalkyl isocyanurate compound of the following formula (I)

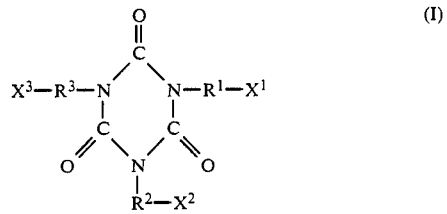

wherein each of $X^1$, $X^2$, and $X^3$ represents a member selected from the class consisting of a hydrogen atom, alkyl group having 1 to 4 carbon atoms, acryloyl group and methacryloyl group, provided that at least two of $X^1$, $X^2$ and $X^3$ are selected from the class consisting of acryloyl and methacryloyl groups, and each of $R^1$, $R^2$ and $R^3$ represents an oxyalkylene group $(-(CH_2)_m O-)$ or poly(oxyalkylene) group $(-(CH_2)_m O-)_n$ where m is from 1 to 12 and n is from 2 to 12, (B) more than 0 and up to 1,000 parts by weight of at least one component selected from the group consisting of
- (b$_1$) a polyacrylic ester or polymethacrylic ester of an oxy or polyoxy-alkanepolyol containing 1 to 3 ether linkages and 3 to 10 hydroxyl groups per molecule, the number average molecular weight of the ester being from about 240 to about 3,000, and
- (b$_2$) a poly(meth)acrylic ester of an alkanepolyol having 4 hydroxyl groups per molecule, (C) 0.01 to 20 parts by weight, per 100 parts by weight of the components (A) and (B) combined, of a polymerization initiator capable of curing said components, and (D) 0 to 200 parts by weight, per 100 parts by weight of the components (A) and (B), of an inorganic solid filler.

2. The composition of claim 1 wherein the polymerization initiator (C) is selected from the group consisting of radical polymerization initiators, photosensitizers and ionic polymerization initiators.

3. The composition of claim 1 wherein the amount of the component (B) is about 5 to about 300 parts by weight per 100 parts by weight of the component (A).

4. The composition of claim 1 wherein the component (A) of formula (I) is at least one isocyanurate compound selected from the group consisting of tris(acryloyloxyethyl)isocyanurate, tris(methacryloyloxyethyl)isocyanurate, tris(2-acryloyloxypropyl)isocyanurate, tris(2-methacryloyloxypropyl)isocyanurate, bis(acryloyloxyethyl)hydroxyethyl isocyanurate, bis(methacryloyloxyethyl)methoxyethyl isocyanurate, bis(2-acryloyloxypropyl)-2-ethoxypropyl isocyanurate, bis(2-methacryloyloxypropyl)-2-hydroxypropyl isocyanurate, tris[acryloyldi(oxyethylene)]isocyanurate, and tris[methacryloyldi(oxyethylene)]isocyanurate.

5. The composition of claim 1 wherein the component (b$_1$) is at least one compound selected from the group consisting of diglycerol triacrylate, diglycerol trimethacrylate, diglycerol tetraacrylate, diglycerol tetramethacrylate, ditrimethylolpropane triacrylate, ditrimethylolpropane tetraacrylate, ditrimethylolpropane tetramethacrylate, trimethylolpropane triacrylate, tritrimethylolpropane trimethacrylate, tritrimethylolpropane pentacrylate, dipentaerylthritol triacrylate, dipentaerythritol trimethacrylate, dipentaerythritol tetraacrylate, dipentaerythritol pentaacrylate, dipentaerythritol pentamethacrylate, dipentaerythritol hexaacrylate and dipentaerythritol hexamethacrylate;

and the component (b$_2$) is at least one compound selected from the group consisting of tetramethylolethane triacrylate, tetramethylolethane trimethacrylate, tetramethylolethane tetraacrylate, tetramethylolethane tetramethacrylate, tetramethylolpropane triacrylate, tetramethylolpropane trimethacrylate, tetramethylolpropane tetraacrylate, tetramethylolpropane tetramethacrylate, tetramethylolbutane triacrylate, tetramethylolbutane trimethacrylate, tetramethylolbutane tetraacrylate, tetramethylolbutane tetramethacrylate, pentaerythritol triacrylate, pentaerythritol trimethacrylate, pentaerythritol tetraacrylate, and pentaerythritol tetramethacrylate.

6. The composition of claim 1 wherein the component (D) is present in an amount of 0.5 to 100 parts by weight, per 100 parts by weight of the components (A) and (B).

7. The composition of claim 6 wherein the inorganic solid filler (D) is a powdery material having an average particle diameter of 1 millimicron to 10 microns and has a refractive index in the range of from 1.40 to 1.60.

8. The composition of claim 6 wherein the inorganic filler comprises finely divided silica.

9. The composition of claim 1 which further comprises, per 100 parts by weight of the components (A) and (B), up to about 1 part by weight of a polymerization inhibitor, up to about 3,000 parts by weight of a solvent, up to about 20 parts by weight of an ultraviolet absorber, up to about 1 part by weight of an antioxidant, and up to about 10 parts by weight of a bleaching agent.

10. The composition of claim 1 which further comprises from 5 to 3,000 parts by weight, per 100 parts by weight of the components (A) and (B), of a solvent selected from the group consisting of hydrocarbon compounds, halogenated hydrocarbon compounds, alcohols, ketones, ethers, nitriles, and organic acid esters.

11. The composition of claim 2 wherein the amount of the polymerization initiator (C) is 0.1 to 10 parts by weight, per 100 parts by weight of the components (A) and (B).

12. The composition of claim 1 wherein the polymerization initiator (C) comprises a photosensitizer and wherein the composition is curable by exposure to ultraviolet irradiation.

13. The composition of claim 1 wherein the polymerization initiator (C) is a radical initiator and wherein the composition is curable by exposure to heat.

14. The composition of claim 1 wherein the polymerization initiator (C) comprises a photosensitizer and a radical initiator and wherein the composition is curable by exposure to both ultraviolet irradiation and heating.

15. A cured coating composition prepared by curing the curable coating composition of claim 1.

* * * * *